UNITED STATES PATENT OFFICE.

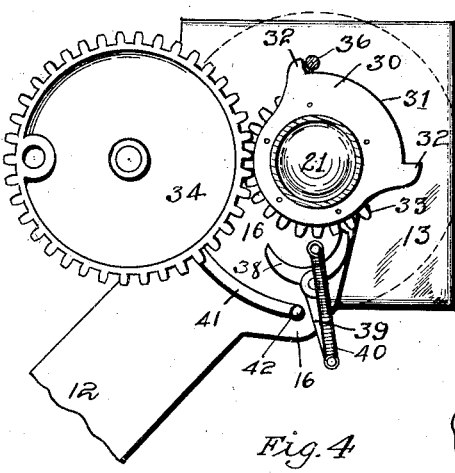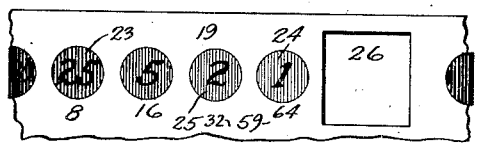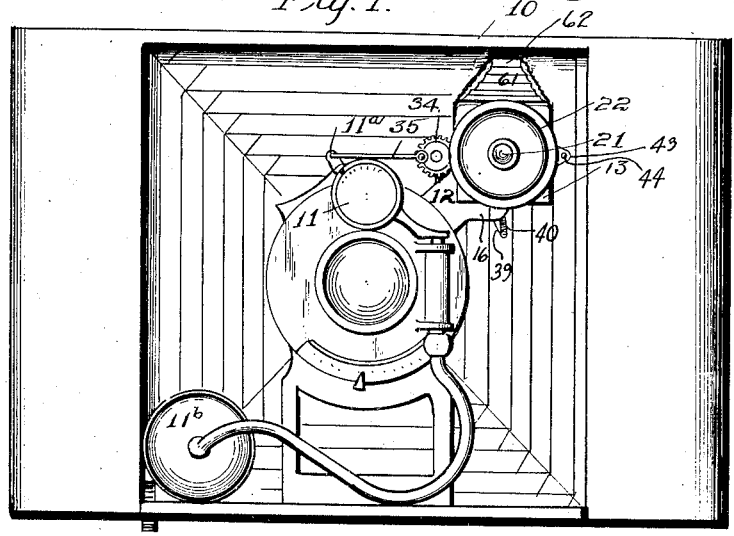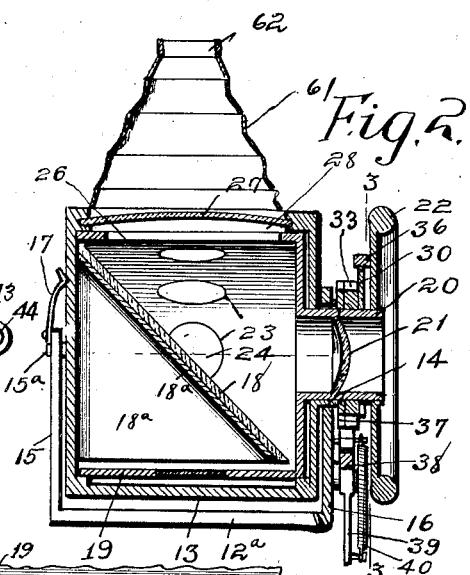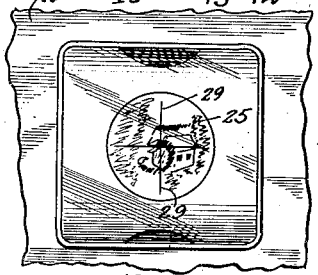

ALFRED G. HAGUE, OF DES MOINES, IOWA.

PHOTOGRAPHIC DEVICE.

1,420,096.

Specification of Letters Patent.   Patented June 20, 1922.

Application filed March 7, 1916. Serial No. 82,531.

*To all whom it may concern:*

Be it known that I, ALFRED G. HAGUE, a citizen of the United States, and resident of Des Moines, in the county of Polk and State of Iowa, have invented a certain new and useful Photographic Device, of which the following is a specification.

The object of my invention is to provide a device for determining and indicating the intensity of light for regulating photographic exposures.

A further object is to provide a device for use in photographic processes, whereby the intensity of light on an object to be photographed may be determined.

A further object is to provide in connection with a camera having a finder, a device operatively connected with the finder in such a way that the intensity of light on a certain portion of the object to be photographed may be determined.

Still a further object is to provide an exposure device adapted for use with a camera having a shutter controlling mechanism for determining the proper time of exposure and so arranged that when the exposure device is operated the timing mechanism of the shutter will be set.

A further object is to provide in connection with a camera having an automatic shutter, a single device to locate the object to be photographed and enable the operator to determine the proper adjustment of the timing of the device of said shutter.

A further object is to provide in connection with a camera having an automatic shutter, and an adjustable finder, a device operatively connected with the finder for enabling the operator to determine the proper adjustment of the timing mechanism of said shutter in any of the positions of the finder.

My invention consists in the construction, arrangement and combination of the various parts of the device, whereby the objects contemplated are attained, as hereinafter more fully set forth, pointed out in my claims and illustrated in the accompanying drawings, in which:

Figure 1 shows a front elevation of a camera, equipped with a photograph device for determining the proper period of exposure, and automatically setting the shutter, embodying my invention.

Figure 2 is a central, vertical, sectional view through an exposure device, embodying my invention.

Figure 3 is a sectional view taken on the line 3—3 of Figure 2.

Figure 4 shows the cylindrical portion of the exposure device extended as a flat blank and Figure 5 shows a detail plan view of the finder screen, with the part of the exposure device below it.

In the illustration of my invention disclosed in the accompanying drawings, I have used the reference numeral 10 to indicate generally the casing of a camera having an automatic timer mechanism of the ordinary type.

The timer mechanism in itself forms no part of my invention and therefore, is not here described in detail, but it should be understood that it may be any suitable automatic timing mechanism, preferably of the type which may be set for operating the shutter for securing exposures for different periods of time. The timing mechanism has an arm 11$^a$ for setting it for different exposures. The bulb 11$^b$ may be employed for operating the shutter after the timing mechanism has been set.

Suitably mounted on a bracket 12 is a finder 13 of the type adapted to tilt to two positions. The bracket 12 has a horizontal extension 12$^a$ at one end of which is the arm 15, on which the rear portion of the finder is pivotally mounted at 15$^a$. The finder in itself is of ordinary construction with the exception of such modifications and additions as are necessary to adapt it to my improved exposure device. The finder 13 comprises a casing having in its forward wall a forwardly extending cylindrical member 14. The bracket 12 also has the upwardly extending arm 16, the upper end of which forms a bearing for the cylindrical portion 14. A friction device 17 is provided for securing the finder in either of its adjusted positions.

Suitably mounted within the finder is an ordinary inclined mirror 18, which is supported upon a bracket 18$^a$ mounted on the rear wall of the finder.

Mounted within the finder is a cylinder 19 made of suitable material and adapted to rotate within the finder. The cylinder, which forms a part of the exposure device, has a forwardly extending cylindrical portion 20 extending beyond the cylindrical portion 14 of the finder casing. The mirror 18 and cylinder 19 are so arranged that the cylinder 19 may rotate freely within the finder casing with the mirror 18 received within the cylinder 19, but rigidly mounted on the finder 13.

The cylinder 19 may be made in several ways. It may be made of paper, celluloid, glass or other transparent or semi-transparent material and coated with opaque paint except for the openings 23 in said coating. The openings or spaces 23 may be treated with a solution similar to that used on photographic plates, then exposed for different lengths of time and developed, to produce portions or openings or spaces 23 of varying transparency.

Mounted in the cylinder 20 is a lens 21 of the kind found in ordinary finders. Mounted on the outer end of the cylinder 20 is a band-wheel 22 or other suitable means for rotating the cylinder 20, and the cylinder 19 within the finder.

Arranged circumferentially of the cylinder 19 is a plurality of openings 23. Arranged to cover the openings 23 there is provided members 24 of different degrees of transparency. The members 24 are arranged in a series, according to their transparency and have on their faces indicating characters 25, and preferably also arranged in a series to indicate progression. The body of the cylinder 19 should be opaque, and the indicating characters should also be such as to render the portion of the member 24 covered by them opaque.

The members 24 are so arranged and preferably in a series that, for instance, the first one will be comparatively transparent; the next one somewhat less transparent; the next one still less transparent, etc.

The cylinder 19 is provided with an opening 26 designed in one position of said cylinder to be brought to register with the opening in the upper end of the finder, so as to permit the use of the finder in the ordinary way.

The finder is provided with the ordinary screen 27 in its upper portion and with an opening 28 in its wall between the screen 27 and the mirror 18. The finder is provided with some indicating means, which may be the crossed lines 29, shown in Figure 5, for indicating the center of the finder screen.

The parts of the device, hereinafter described, are so arranged that the cylinder 19 may be turned to position for bringing the opening 26 in the cylinder 19 opposite the opening 28 in the top of the finder and between the mirror 18 and the screen 27. When the cylinder 19 is in such position, the finder may be used in the ordinary way.

When it is desired to determine the intensity of light for judging the proper exposure which should be given for taking a picture, the wheel 22, or whatever equivalent thereof may be used, may be moved for rotating the cylinder 19. If the light is fairly bright or intense, then when the first member 24 is brought opposite the finder screen and below the center thereof, the opaque indicating character on said member 24 will be clearly visible through the finder. When the cylinder 19 is further rotated, the indicating character on the second member 24 may or may not be visible. When the cylinder 19 has been rotated until the opaque indicating character 25 on one of the members 24 cannot be seen, the intensity of light is ascertained with sufficient accuracy to determine the proper exposure.

The form of the exposure device illustrated is especially designed to be used with mechanism for automatically setting the shutter for different exposures according to the intensity of light, as indicated by the exposure device, which mechanism is adapted to be operated in different positions of the finder. The mechanism just mentioned will now be described.

The cylinder 19 normally stands in position with the opening 26 below the opening 28. Loosely mounted on the cylindrical extension 20 is a plate 30 having one edge 31 curved on the arc of a circle having its center at the center of the cylindrical extension 20. The curved portion 31 is equal to one-fourth of the circumference of such a circle.

Formed on the plate 30 at each end of the portion 31 is a lug 32 extending radially outwardly.

Fixed to the plate 30 and also loosely mounted on the cylindrical extension 20 is a gear 33 which is in mesh with a gear 34 mounted on the upwardly extending portion 16 of the bracket 12. Pivoted off center on the gear 34 is a link 35, one end of which is pivoted to the arm 11$^a$. When the parts are in normal position and before their operation for accomplishing any of the purposes of my invention, the link 35 is horizontally arranged with its pivotal point on the gear 34 farthest away from the center of the cylindrical extension 20.

On the member 22 is a pin 36 designed to travel along the curved edge 31 of the plate 39 and in certain positions of the movement of the parts, engage the respective members 32.

Fixed on the member 20 is a gear 37.

Pivoted to the bracket arm 16 near the gear 37 is a double pawl 38 having a downwardly extending arm 39. A spring 40 is secured to the bracket arm 16 between the member 20. The lower end of the spring 40 is secured to the lower end of the arm 39, as shown in Figure 3. The spring 40 is arranged so that when one of the arms of the pawl 38 is in engagement with the gear 37, it will be yieldingly held in such position by the spring 40, and when the arm 39 is swung for moving the spring 40 over center, the other arm of the pawl 38 will be held in engagement with the teeth of the gear 37.

In the arm 16 is formed a curved slot 41 in which travels a pin 42 on the finder casing 13. The slot 41 is of such length as to permit a quarter rotation of the finder.

On the finder 13 is an ear or the like 43 from which extends a pin 44. The pins 42 and 44 are adapted to engage the arm 39 when the finder is turned over, for moving the spring over center.

Assuming that the parts are in the positions shown in Figures 1 and 3, then the practical operation of my improved exposure device is as follows:—

When it is desired to take a picture, and assuming that the film or plate is properly placed in the camera, then the camera is put in position in front of the object, and is adjusted until the image of the object, to be photographed appears on the finder screen.

It will be understood that the cylinder 19 stands in position with the opening 26 registering with the opening 28 and the finder screen 27. When the image of the important part of the object to be photographed is at the center of the finder, as indicated by the means 29, then the operator grasps the member 22 and rotates the cylinder 19 for making the various members 24 pass beneath the finder screen.

The parts are so arranged that when the cylinder 19 has been rotated for bringing the members 24 successively below and past the screen 27, until the indicating character 25 on one of the members 24 cannot be read or seen, the gear 33 will have been rotated for rotating the gear 34 and operating the link 35 for setting the automatic timing mechanism in proper position for making the exposure required by the light. The shutter can then be operated and the exposure made.

When the member 22 is moved for returning the cylinder 19 to its normal position, the timing mechanism will also be returned to its starting position. This movement is completed by rotating the member 22 in the direction in which it was originally started, and turning the gear 34 a complete revolution.

Assuming that the parts are in the position shown in Figure 3, and it is desired to take the picture the other way of the film or plate, then it is necessary, first, to turn the camera over a quarter turn and adjust the finder by giving it a quarter turn. The finder is turned from the position shown in Figure 3 clockwise, thereby causing the pin 42 to move to the other end of the slot 41 and pin 44, to position where it engages the arm 39 and swings it to the left for moving the spring 40 over center and causing the other end of the pawl 38 to engage the gear 37.

The cylinder 19, the plate 30, the gear 33, and the member 22 do not rotate with the finder when the finder is given a quarter turn.

After the finder has been given such quarter turn, the member 22 is then rotated, bringing the opening 26 to position where it registers with the finder screen. Such movement, of course carries the pin 36 along the curved edge 31 to the lug 32 opposite the one which the pin 36 originally engaged. The parts are then in position for another operation. The member 22 is then turned in the opposite direction from that used in the first operation of the machine described, until one of the indicating characters 25 becomes visible, whereupon the hand-wheel is turned back until the next member 24 is below the finder. It will, of course, be understood that the parts may be so arranged that the last visible member 25 indicates the density of light. In this connection attention is called to the manner in which the link 35 is connected with the gear 34, whereby rotation of the gear 34 in either direction will properly operate the timing mechanism.

The finder of a camera equipped with my improved exposure device may, if desired, be provided with a light excluding device comprising a substantially cone-shaped collapsible hollow member 61, surrounding the screen 27, and having in its contracted upper end a suitable opening 62 for permitting inspection of the finder screen. The object of the device just described, is to exclude from the finder screen practically all light except that reflected from the mirror in the finder.

The advantages of an exposure device such as have been hertofore described, may be largely seen from the foregoing description.

One of the difficulties for all photographers and especially for amateurs arises from the inability of the photographer to determine the proper exposure to be given a film or plate in taking a picture. By using an exposure device such as herein disclosed, the intensity of the light may be approximately determined for the purpose of giving the proper exposure.

My device may be made in a great variety of forms, and the form herein is simply illustrative of my invention, and it is my intention to cover by my present application any form of the device involving the invention herein disclosed, which may be included within the scope of my claims.

I claim as my invention.

1. In a camera, an automatic shutter having a timing device, said timing device including an adjustable arm, a view finder including a casing, an exposure meter embodying a pivoted element arranged within said casing and having spaced portions of different degrees of translucency, means connecting the pivoted element and the adjustable arm so that the arm is shifted upon the movement of the element, and manually operated means to move the pivoted element.

2. In a camera, an automatic shutter having a timing device, a combination view finder and exposure meter, arranged to be moved to different operative positions, and provided with an element having portions of different degrees of transparency arranged to be successively disposed in the path of rays of light, manually operated means for simultaneously setting the timing device and operating the said element in either position of the view finder and exposure meter.

3. In a camera, an automatic shutter having a timing device, said timing device including an adjustable arm, a view finder including a casing and a reflector therein, an exposure meter embodying a rotatable cylinder within the casing and having a reflector arranged therein, said cylinder having spaced portions of different degrees of translucency which are adapted to be moved into the path of light within the finder, means including gears connecting the rotatable cylinder and the adjustable arm, and manually operated means to turn the rotatable cylinder.

4. In a camera, an automatic shutter having a timing device, a combination view finder and exposure meter provided with a movable exposure element, and arranged to be moved to different operative positions, means for simultaneously operating the timing device and the said exposure element when the view finder and exposure meter is in either of its operative positions.

5. In a camera, an automatic shutter having a timing device, a combination view finder and exposure meter arranged to be moved to different operative positions, and provided with an exposure element having members of different degrees of transparency, each of said members being provided with an opaque indicating character, said members being arranged to be successively disposed in the path of rays of light, manually operated means for simultaneously setting the timing device and exposure elements in either position of the view finder and exposure meter.

6. In combination, a supporting plate, a shutter box mounted on said plate, shutter timing mechanism, an image forming finder mounted on said plate, said finder having a field for defining an image, illumination controlling means for varying the amount of light in said field, and means connecting last said means with said shutter timing mechanism.

Des Moines, Iowa, February 3, 1916.

ALFRED G. HAGUE.